United States Patent Office 3,049,476
Patented Aug. 14, 1962

3,049,476
FERMENTATION PROCESS FOR PRODUCING NOVOBIOCIN
Ian M. Miller, Liberty Corner, N.J., assignor to Merck & Co., Inc., Rahway, N.J., a corporation of New Jersey
No Drawing. Filed Apr. 19, 1956, Ser. No. 579,133
7 Claims. (Cl. 195—80)

This invention is concerned with methods of obtaining novobiocin fermentation broths of enhanced potency. More particularly, it is concerned with carrying out the cultivation of Streptomyces spheroides in the presence of minor amounts of 3-(γ,γ-dimethylallyl)-4-hydroxybenzoic acid, 3-(3-methylbutyl)-4-hydroxybenzoic acid and substituted amido derivatives thereof.

Novobiocin (the generic name for an antibiotic the proprietary name for one brand of which is "Cathomycin"), is produced by growing, under controlled conditions, a previously unknown species of microorganism which has been named Streptomyces spheroides. This microorganism, which was isolated from a sample of soil from an old sod pasture in Vermont, has been designated Streptomyces spheroides MA–319 in the culture collection of Merck & Co., Inc., Rahway, New Jersey. A viable culture thereof has been deposited with the Fermentation section of the Northern Utilization Research Bureau, United States Department of Agriculture at Peoria, Illinois, and added to its permanent culture collection as NRRL 2449.

Aqueous media that are suitable for aerobic cultivation of strains of Streptomyces spheroides to produce novobiocin are, generally stated, those suitable for the production of other antibiotics by cultivation of other Streptomyces organisms. Such media contain sources of assimilable carbon, such as a carbohydrate; of assimilable nitrogen, such as corn steep liquor, casein hydrolysate, distiller's solubles, or the like; and inorganic salts, including trace metals, required for proper metabolism of the microorganism. Preferably, the medium is maintained at a temperature of 24°–28° C. during the period, usually about one to seven days, in which the microorganism is cultivated, and aeration is provided for optimum growth of the organism and production of novobiocin. Fermented broths produced in this manner have an activity of about 150–2000 novobiocin units, as hereinafter defined, per milliliter, and the fermentation broth solids have an activity of the order of about 2.25 novobiocin units per milligram of solids. The antibioactive material can be purified and recovered in purer form by any of several procedures.

For example, the whole broth may be filtered at the hydrogen-ion concentration of harvest, usually about pH 7.0–8.0; the filtrate may be extracted at a hydrogen-ion concentration within the acid range below about pH 7.0 with a substantially neutral, merely slightly polar, water immiscible, liquid organic solvent soluble in cold concentrated sulfuric acid and in cold syrupy orthophosphoric acid; and the organic extract may be extracted with an aqueous alkaline buffer solution at a hydrogen-ion concentration of at least pH 8.5 to obtain a solution containing a substantial concentration of novobiocin salt. The two extraction steps may be repeated in succession, to obtain an even more concentrated solution from which novobiocin-active material may be recovered by acid precipitation. The product thus obtained may be purified by recrystallization from an aqueous acidic alcohol solution.

This new antibiotic, novobiocin, is comprised of the elements carbon, hydrogen, nitrogen, and oxygen, combined in a substance having approximately the formula $C_{31}H_{36}N_2O_{11}$ according to present data. It reacts as an acidic organic compound toward and is easily soluble in alkaline reagents, such as aqueous solutions of alkali-metal hydroxides, carbonates, and bicarbonates; it has two base-binding groups and can be precipitated from its solution in alkalis by acidification. It is soluble in the lower alkanols, lower aliphatic ketones, acetic acid, ethyl acetate, dioxane; and it is insoluble or merely sparingly soluble in ether, benzene, chloroform, carbon tetrachloride, ethylene dichloride, water and hydrochloric acid.

Substantially pure novobiocin has been obtained in two crystalline modifications: a form crystallizing as rosettes and melting at about 152°–154° C., and another form having the appearance of flat needles, melting at about 170°–172° C. Each of these crystalline forms of the antibiotic can be converted into a so-called normalized form, which may be an amorphous or sub-microcrystalline form, by dissolving the crystals in acetone, quickly adding to this solution a relatively large volume of petroleum ether, and recovering the precipitated normalized material by filtration.

Alkaline aqueous solutions of novobiocin and mineral oil suspensions of the normalized form of the antibiotic exhibit characteristic absorption, the former in the ultraviolet and the latter in the infrared portions of the radiation spectrum. A solution of substantially pure novobiocin in 0.1 N aqueous sodium hydroxide exhibits a characteristic ultraviolet absorption peak at 3070 A. This absorption peak is indicative of a substantially pure material having a specific absorbency of 600, measured at this wavelength, using a solution containing one gram of pure novobiocin per hundred milliliters of the solution, contained in a cell having an absorption path of one centimeter. A solution of pure novobiocin in 0.1 N aqueous-methanolic hydrochloric acid exhibits a characteristic ultraviolet absorption peak at 3240 A. with $$E_{1cm}^{1\%} 390$$

A mineral oil suspension of substantially pure normalized novobiocin exhibits characteristic infrared absorption peaks at the following wavelengths, expressed in microns; 5.8–6.0 (broad), 6.10, 6.21, 6.30, 6.49, 6.63, 7.4–7.6 (broad shoulder), 7.78, 7.96, 8.27 (weak), 8.60 (shoulder), 8.7 (shoulder), 9.13, 9.40, 10.0–10.1 (broad), 10.28, 10.60 (broad), 12.0–12.30 (broad), 12.60–12.75 (broad), 13.07, and 13.39.

Novobiocin units are related to the microbiological activity of substantially pure crystalline novobiocin; the microbiological activity of substantially pure crystalline novobiocin has been arbitrarily taken as 5,000 units per milligram, as determined by standard cup-plate diffusion methods, using Bacillus subtilis ATTC 12,432 as the test organism.

In brief, by this procedure, a culture of B. subtilis ATTC 12,432 is cultivated on brain heart infusion agar slants (Difco Manual, 9th edition, pages 90, 91) for 24 hours at 37° C. and is then stored at 5° C. for periods no longer than a month. For preparation of spores, an inoculum is prepared by adding 5 ml. of sterile, distilled water to a freshly cultivated B. subtilis slant. The cells are asceptically scraped from the slant, mixed well, and transferred to 50 ml. of sterile, distilled water in an Erlenmeyer flask. Two ml. of the bacterial suspension is added, as an inoculum to a Roux bottle containing a medium consisting of 3 percent soybean meal, 0.2 percent NaCl, 0.4 percent distillers' solubles, 0.8 percent dextrose, and 2.0 percent agar. After incubation for 7 days at 37° C. the bacterial growth obtained is suspended in 50 ml. of sterile, distilled water and pasteurized at 65° C. for 30 minutes. Four ml. of a 1:50 dilution of this spore suspension is used per liter of assay medium containing 0.5 percent pentone, 0.3 percent beef extract, 0.3 percent yeast extract, and 1.5 percent agar at a pH of 5.9–6.1. Fifteen ml. quantities of seeded medium are distributed into deep flat-bottom Petri dishes.

Six stainless steel cylinders are placed on the seeded agar. Three alternate cylinders are filled with standard solution of 4 micrograms of novobiocin/ml. (equivalent to 20 units of novobiocin/ml.), and three with the unknown solution diluted approximately to the same potency with M/20 phosphate buffer at pH 6.0. A daily standard curve is prepared with pure novobiocin diluted to various concentrations ranging from 2 to 16 μg./ml.

After 18 hours' incubation at 28° C., diameters of the inhibitory zones of the unknown and the standard solutions on each plate are measured. The potency of the unknown is determined from a nomograph based on the degree of response at various concentrations established from the daily standard curve.

Novobiocin is optically active, $[\alpha]_D^{25} = -27°$ (c., 1 in 1 N sodium hydroxide) and $[\alpha]_D^{25} = -44°$ (c., 1 in pyridine).

Novobiocin is active in inhibiting growth of gram-positive microorganisms primarily, although it also exhibits some activity against gram-negative microorganisms. It inhibits growth of the following organisms, inter alia:

*M. pyogenes* var. *albus*
*M. pyogenes* var. *aureus*
*Diplococcus pneumoniae*
*Corynebacterium diphtheriae* type gravis
*Corynebacterium diphtheriae* type intermedius
*Corynebacterium diphtheriae* type mitis
*Corynebacterium xerose*
*Corynebacterium renale*
*Neisseria meningitidis*
*Sarcina lutea* (VD)
*M. pyogenes* var. *aureus* resistant to aureomycin
*M. pyogenes* var. *aureus* resistant to streptomycin-streptothricin
*M. pyogenes* var. *aureus* resistant to penicillin Novobiocin salts also have antibiotic activity. For example, the sodium salt of novobiocin, when tested by the agar streak dilution assay, was found to inhibit the growth of various strains of *M. pyogenes* var. *aureus*, *M. pyogenes* var. *albus*, *Neisseria meningitidis* (No. 274), and *Sarcina lutea* (VD) at concentrations below 0.5 mcg. per ml. Other microorganisms are also affected by novobiocin or its salts in varying degrees.

It is an object of the present invention to provide a method of obtaining fermentation broths having enhanced novobiocin activity. Other objects will be apparent from the detailed description of the invention hereinafter provided.

In accordance with the present invention, it is now found that the addition of small amounts of 3-(3-methylbutyl)-4-hydroxybenzoic acid, 3-(γ,γ-dimethylallyl)-4-hydroxybenzoic acid, and amido derivatives thereof in fermentation mediums employed for the cultivation of *Streptomyces spheroides* acts as a precursor and results in the production of fermentation broths having enhanced novobiocin activity.

The amido derivatives of 3-(3-methylbutyl)-4-hydroxybenzoic acid and 3-(γ,γ-dimethylallyl)-4-hydroxybenzoic acids which have been found to be particularly useful in producing fermentation broths having enhanced activity are 3-(3-[3-methylbutyl]-4-hydroxybenzamido)-4,7-dihydroxy-8-methylcoumarin (I) and 3-(3-[γ,γ-dimethylallyl] - 4 - hydroxybenzamido) - 4,7 - dihydroxy-8-methylcoumarin (II). These compounds can be shown structurally as follows:

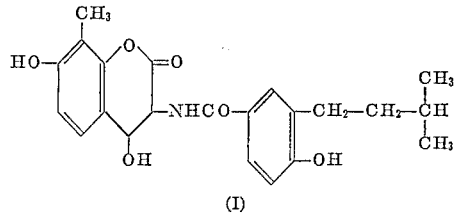

(I)

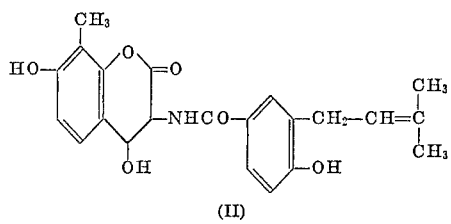

(II)

The optimum concentration of these substances in the medium will depend, in part, upon the particular fermentation medium used. In general, it is found that concentration of these precursors in excess of about 0.1 mg./ml. in the fermentation medium inhibits the growth of the microorganism. Thus, in using these precursors in a synthetic medium, such as a proline-glucose medium, it is found that concentrations greater than about 0.1 mg. per ml. cannot be used since the presence of larger amounts of the precursors inhibits the formation of the antibiotic. Usually it is found that with such synthetic mediums a concentration of about 0.05 mg. per ml. or lower is satisfactory and results in broths having greatly enhanced novobiocin activity.

In carrying out the processes of the present invention, it is found that the precursors are most conveniently added directly to the fermentation medium prior to sterilization and cultivation of the medium with the novobiocin-producing strain of *Streptomyces spheroides*. Alternatively, the precursors can be added to the sterilized medium aseptically either before or during the actual fermentation period. Thus, an aseptic solution of precursor in water or another suitable solvent, such as an alcohol, can be sterilized by passage through a porcelain candle of the Selas type prior to incorporation in the sterilized nutrient medium. As indicated above, this addition of the sterilized precursors can be effected either prior to the start of the fermentation or during the actual cultivation of the microorganism.

The following example is presented as an illustrative embodiment of the present invention.

EXAMPLE

A yeast extract-dextrose agar adjusted to a pH of about 7.0 was sterilized, cooled, and inoculated with *Streptomyces spheroides* NRRL 2449 from a soil tube. The yeast extract-dextrose plants are then incubated at 28° C. for about seven days until the cultures were well sporulated. The vegetative spores were then stored at 4–8° C. until needed. The yeast extract-dextrose agar was made up in tap water and contained the following:

| | Percent |
|---|---|
| Difco yeast extract | 1.0 |
| Dextrose | 1.0 |
| $MgSO_4 \cdot 7H_2O$ | 0.05 |
| Agar | 2.0 |
| .67 M $Na_2HPO_4$—$KH_2PO_4$ (pH 7) | 2.0% (by volume) |

The further development of inoculum was continued in a distiller's solubles medium containing 3% of distiller's solubles and 2.0% of dextrose in tap water; the pH of the medium being adjusted to about 7.0–7.2. Forty ml. of this medium was placed in 250 ml. Erlenmeyer shake flasks and the flasks and contents sterilized by heating in an autoclave at about 120° C. for about twenty minutes. After cooling, the sterilized flasks are inoculated by transferring a heavy conidial inoculum from the yeast extract-dextrose slants. The flasks and contents were then incubated at 28° C. for 3 days on a rotary shaker (220 r.p.m.).

The medium, a proline-glucose medium, for the production of novobiocin was prepared by dissolving the following in tap water:

|  | Percent |
|---|---|
| L-proline | 1.0 |
| Glucose | 1.0 |
| NaCl | 0.5 |
| $K_2HPO_4$ | 0.2 |
| $MgSO_4.7H_2O$ | 0.1 |
| $CaCl_2.2H_2O$ | 0.04 |
| $FeSO_4.7H_2O$ | 0.02 |
| $ZnSO_4.7H_2O$ | 0.01 | and adjusting the solution to a pH of 7.0–7.2 before use.

Forty ml. of this medium was dispensed in 250 ml. Erlenmeyer shake flasks, and the flasks and contents sterilized by heating in an autoclave at about 120° C. for about twenty minutes. The cooled sterilized medium was then inoculated with one ml. of vegetative inoculum prepared in the distiller's solubles medium described above. The flasks were set up in triplicate and were incubated at 25° C. in a rotary shaker (220 r.p.m.) for seven days; aliquots being removed at six days. These samples, plus the seven day samples, were assayed for novobiocin activity by diluting them in 0.05 M phosphate buffer (pH 6) to contain about 4 micrograms per ml. of novobiocin and determining the growth inhibition of Bacillus subtilis in the cup-plate assay in comparison with novobiocin as a standard. The dry weight of the produced mycelium was also determined on the seven day samples by centrifuging an aliquot of the broth, resuspending the solids in distilled water, recentrifuging and drying the solids to a constant weight at 105° C.

The activity of 3-(3-methylbutyl)-4-hydroxybenzoic acid, 3 - ($\gamma,\gamma$-dimethylallyl) - 4 - hydroxybenzoic acid and their substituted amido derivatives in producing fermentation broths of enhanced antibiotic activity was demonstrated by adding varying amounts of these compounds to the proline-glucose medium described above and carrying out the shake flask fermentations as described.

The results of typical experiments in which the proline-glucose medium is supplemented by the addition of these hydroxybenzoic acid compounds or their substituted amido derivatives are summarized in the following tables:

(A) *3-($\gamma,\gamma$-Dimethylallyl)-4-Hydroxybenzoic Acid*

EXPERIMENT 1

| Medium | Amount of precursor added, mg./ml. | Day when added to fermentation | Activity, mcg./ml. | Mycelium weight, mg./ml. | Mcg. of activity per mg. of dry mycelium |
|---|---|---|---|---|---|
| Proline-glucose | None |  | 74 | 8.1 | 8 |
| Do | 0.05 | 0 | 143 | 8.6 | 17 |
| Do | 0.05 | 3rd | 164 | 8.9 | 18 |
| Do | 0.05 | 3rd and 4th | 148 | 7.0 | 19 |
| Do | 0.05 | 3rd, 4th, and 5th | 113 | 7.1 | 16 |

EXPERIMENT 2

| Proline-glucose | None |  | 123 | 16.1 | 8 |
|---|---|---|---|---|---|
| Do | 0.1 | 0 | 87 | 6.8 | 13 |
| Do | 0.05 | 0 | 203 | 12.8 | 16 |
| Do | 0.01 | 0 | 154 | 16.2 | 10 |

(B) *3-(3-[$\gamma,\gamma$-Dimethylallyl]-4-Hydroxybenzamido)- 4,7-Dihydroxy-8-Methylcoumarin*

EXPERIMENT 3

| Medium | Amount of precursor added, mg./ml. | Day when added to fermentation | Activity, mcg./ml. | Mycelium weight, mg./ml. | Mcg. of activity per mg. of dry mycelium |
|---|---|---|---|---|---|
| Proline-glucose | None |  | 190 | 14.1 | 13 |
| Do | 0.05 | 3rd | 115 | 6.6 | 17 |
| Do | 0.01 | 3rd | 257 | 14.8 | 17 |

(C) *3-(3-Methylbutyl)-4-Hydroxybenzoic Acid*

EXPERIMENT 4

| Medium | Amount of precursor added, mg./ml. | Day when added to fermentation | Activity, mcg./ml. | Mycelium weight, mg./ml. | Mcg. of activity per mg. of dry mycelium |
|---|---|---|---|---|---|
| Proline-glucose | None |  | 123 | 16.1 | 8 |
| Do | 0.1 | 0 | 72 | 4.9 | 11 |
| Do | 0.05 | 0 | 223 | 10.5 | 21 |
| Do | 0.01 | 0 | 261 | 15.9 | 16 |

(D) *3-(3-[3-Methylbutyl]-4-Hydroxybenzamido)- 4,7-Dihydroxy-8-Methylcoumarin*

EXPERIMENT 5

| Medium | Amount of precursor added, mg./ml. | Day when added to fermentation | Activity, mcg./ml. | Mycelium weight, mg./ml. | Mcg. of activity per mg. of dry mycelium |
|---|---|---|---|---|---|
| Proline-glucose | None |  | 210 | 15.9 | 13 |
| Do | 0.05 | 3rd | 238 | 8.8 | 27 |
| Do | 0.05 | 3rd and 4th | 410 | 10.2 | 40 |

EXPERIMENT 6

| Proline-glucose | None |  | 142 | 15.2 | 9 |
|---|---|---|---|---|---|
| Do | 0.05 | 3rd | 172 | 11.5 | 15 |

EXPERIMENT 7

| Proline-glucose | None |  | 190 | 14.1 | 13 |
|---|---|---|---|---|---|
| Do | 0.01 | 3rd | 315 | 13.5 | 23 |

In all of the experiments summarized in the tabulated results, the proline-glucose medium was the one described in detail above. In each case the shake flask fermentations were prepared, inoculated and incubated as described above. The four compounds tested for precursor activity were added to the mediums as a 0.4% solution in 95% ethanol needed to dissolve the compound. When the compounds were added to the medium during the fermentation, it was done aseptically with a sterilized solution of the compound being tested. When the precursor was added to the fermentation medium initially, it was added as a solution in ethanol and sterilized in the shake flask with the medium. In each of the experiments, except Experiment 7 the tabulated results are averages of triplicate shake flask fermentations.

In some of the tabulated results above the activity of the supplemented fermentation broths was not greater than the unsupplemented or control broths. In these cases the precursor effect of the added compounds is demonstrated by calculating the activity on the basis of the amount of mycelium formed.

The 4-hydroxybenzoic acids and the substituted amido derivatives thereof used in the foregoing experiments can be prepared as follows:

(A) *Preparation of 3-(γ,γ-Dimethylallyl)-4-Hydroxybenzoic Acid*

A mixture of 7 g. of sodium metal cut into small pieces, 300 ml. of dry toluene, and 50 g. of ethyl-p-hydroxybenzoate is heated under reflux and stirred for a few hours. The mixture is cooled in an ice bath and stirred while 50 g. of γ,γ-dimethylallyl bromide is added dropwise during a period of two hours. The reaction mixture is stirred for fifteen hours at room temperature and then warmed to 50° C. for one-half hour. After filtration to remove sodium bromide, the toluene solution is concentrated under reduced pressure to 100 ml. and extracted three times with 100 ml. portions of 2.5 N sodium hydroxide. The alkaline extracts are combined, cooled to 0° C. and carefully acidified to pH 6 with 2 N sulfuric acid. The heavy oil which separates is extracted with ether, dried over magnesium sulfate and concentrated in vacuo; weight 42 g. This oil is dissolved in cyclohexane and extracted with a saturated solution of sodium carbonate to remove some unreacted ethyl p-hydroxybenzoate. The cyclohexane layer is dried over magnesium sulfate and concentrated in vacuo. The residue is dissolved in a boiling mixture of equal parts of cyclohexane and petroleum ether (B.P. 30–60° C.). After cooling at room temperature for a few hours and 3° overnight, the colorless prisms are collected on a filter; M.P. 62–66° C. Recrystallization from a mixture of cyclohexane and petroleum ether (B.P. 30–60° C.) affords 18.9 g. of ethyl 3-(γ,γ-dimethylallyl)-4-hydroxy-benzoate as colorless prisms; M.P. 66–69° C.

A solution of 7 g. of ethyl 3-(γ,γ-dimethylallyl)-4-hydroxybenzoate in 30 ml. of 4 N sodium hydroxide is heated on the steam cone for four hours. After cooling in an ice bath, the resulting solution of the sodium salt of 3-(γ,γ-dimethylallyl)-4-hydroxybenzoic acid is acidified with dilute hydrochloric acid and extracted with ether. The combined ether extracts are washed with water, dried over magnesium sulfate, filtered, and concentrated in vacuo. The residue is dissolved in hot benzene and crystallized by slowly adding cyclohexane; M.P. 80–84° C. Recrystallization from a mixture of benzene and cyclohexane gives colorless prisms; M.P. 87–89° C. Several recrystallizations from benzene affords 3-(γ,γ-dimethylallyl)-4-hydroxybenzoic acid prisms melting at 94–95° C.

(B) *Preparation of 3-(3-Methylbutyl)-4-Hydroxybenzoic Acid*

A solution of 3 g. of ethyl 3-(γ,γ-dimethylallyl)-4-hydroxybenzoate in 50 ml. of ethanol is hydrogenated over 0.5 g. of platinum oxide catalyst. The theoretical amount of hydrogen is taken up within one hour. After removal of the catalyst by filtration, the alcohol is distilled under reduced pressure. The ethyl 3-(3-methylbutyl)-4-hydroxybenzoate is dissolved in 20 ml. of 4 N sodium hydroxide and heated on the steam cone for four hours. After acidification with hydrochloric acid, the mixture is extracted with ether. The ether extract is dried over magnesium sulfate, filtered, and concentrated in vacuo. The residue is dissolved in hot benzene and cyclohexane is added. After cooling, the 3-(3-methylbutyl)-4-hydroxybenzoic acid is collected on a filter. Recrystallization from a mixture of chloroform and cyclohexane gave colorless needles; M.P. 108–9° C.

(C) *Preparation of 3-(3-[γ,γ-Dimethylallyl]-4-Hydroxybenzamido)-4,7-Dihydroxy-8-Methylcoumarin*

(1) *Preparation of 3-amino-4,7-dihydroxy-8-methylcoumarin hydrochloride.*—Thirty-seven grams of 2-methylresorcinol (R. C. Shah and M. C. Laiwalla, J. Chem. Soc., 1938, 1828) and 34 g. of ethyl cyanoacetate are dissolved in 150 ml. of ether. The solution is cooled in an ice-bath and 20 g. of fused zinc chloride is added in portions with stirring. Dry hydrogen chloride gas is then passed into the ice-cold mixture for two hours. The ice-bath is removed and the mixture is allowed to warm up to room temperature and kept for two days. The solid product 7-hydroxy-4-imino-8-methyl-2-oxachroman is separated by filtration, washed with a little cold water and dried in a vacuum desiccator over phosphorus pentoxide.

A solution of 18 g. of 7-hydroxy-4-imino-8-methyl-2-oxochroman in 400 ml. of 50% sulfuric acid is heated on the steam bath for 20 hours. The mixture is cooled in an ice bath and the solid 4,7-dihydroxy-8-methylcoumarin is collected on a filter, washed with ice-cold water and dried in a vacuum desiccator over phosphorus pentoxide.

To a suspension of 0.54 g. of 4,7-dihydroxy-8-methylcoumarin in 100 ml. of water is added a solution of 0.20 g. of sodium nitrite in 5 ml. of water. The mixture is kept at room temperature and shaken frequently for 3 hours, during which time the coumarin slowly dissolves. The clear, greenish-brown solution is filtered to remove a trace of solid material and is then cooled in an ice-bath and acidified with acetic acid. When crystallization is complete, the solid 2,4-dioxo-7-hydroxy-8-methyl-3-oximinochroman is collected on a filter, washed with a little ice-cold water and dried in a vacuum desiccator over phosphorus pentoxide.

A solution of 100 mg. of 2,4-dioxo-7-hydroxy-8-methyl-3-oximinochroman in 20 ml. of absolute ethanol is added to a suspension of 0.5 g. of prereduced palladium on Darco (10%) in 20 ml. of absolute alcohol and 0.6 ml. of 2.5 N hydrochloric acid. The mixture is shaken with hydrogen at 25° C. until the calculated amount is absorbed. The catalyst is removed by filtration and the filtrate is evaporated to dryness under reduced pressure. The 3-amino-4,7-dihydroxy-8-methylcoumarin hydrochloride is recrystallized from alcohol.

(2) *Preparation of 3-(γ,γ-dimethylallyl)-4-acetoxybenzoyl chloride.*—A solution of 20.6 g. (0.1 mole) of 3-(γ,γ-dimethylallyl)-4-hydroxybenzoic acid in 100 ml. of dry pyridine is treated with 12.8 g. (0.125 mole) of acetic anhydride and kept at room temperature overnight. The reaction mixture is diluted with 400 ml. of ice and water and acidified with concentrated hydrochloric acid. The precipitated product is removed by filtration. The crude product is recrystallized to yield purified 3-(γ,γ-dimethylallyl)-4-acetoxybenzoic acid.

A suspension of 24.8 g. (0.1 mole) of 3-(γ,γ-dimethylallyl)-4-acetoxybenzoic acid in 50 ml. of water is treated with 40 ml. of 2.5 N NaOH. The resultant solution is lyophilized to yield a residue of sodium 3-(γ,γ-dimethylallyl)-4-acetoxybenzoate. The sodium salt is added portionwise with stirring at ice temperature to a solution of 127 g. (1 mole) of oxalyl chloride in 400 ml. of dry benzene. After the final addition, stirring is continued for about 2 hours. The precipitated sodium chloride is removed and the filtrate is concentrated at reduced pressure. The residue is redissolved in benzene and reconcentrated to remove last traces of oxalyl chloride from the 3-(γ,γ-dimethylallyl)-4-acetoxybenzoyl chloride.

(3) *Condensation of 3-(γ,γ-dimethylallyl)-4-acetoxybenzoyl chloride with 3-amino-4,7-dihydroxy-8-methylcoumarin hydrochloride.*—A suspension of 12.2 g. (0.05 mole) of 3-amino-4,7-dihydroxy-8-methylcoumarin hydrochloride in 100 ml. of water containing 16 g. of sodium acetate is treated portionwise with 13.4 g. (0.05 mole) of 3-(γ,γ-dimethylallyl)-4-acetoxybenzoyl chloride while the mixture is shaken. The mixture is shaken for about one hour after the final addition of acid chloride. The mixture is acidified to about pH 2 with hydrocholric acid. The 3-(3-[γ,γ-dimethylallyl]-4-acetoxybenzamido)-4,7-dihydroxy-8-methylcoumarin is removed and purified by recrystallization.

This acetoxy derivative is dissolved in an excess of dilute sodium hydroxide solution and allowed to stand at room temperature for several hours. The mixture is acidified to a pH of about 2 whereupon the 3-(3-[γ,γ-dimethylallyl] - 4 - hydroxybenzamido) - 4,7 - dihydroxy-8-methylcoumarin precipitates and is recovered by filtration.

*(D) Preparation of 3-(3-[3-Methylbutyl]-4-Hydroxybenzamido)-4,7-Dihydroxy-8-Methylcoumarin*

(1) *Preparation of 3-(3-methylbutyl)-4-acetoxybenzoyl chloride.*—A mixture of 10.4 g. (0.005 mole) of 3-(3-methylbutyl)-4-hydroxybenzoic acid and 50 ml. of pyridine is treated with 10 ml. of acetic anhydride. The mixture is kept at room temperature overnight. The mixture is poured into 300 ml. of ice and water. The resultant mixture is acidified to about pH 2 with concentrated hydrochloric acid. The precipitated 3-(3-methylbutyl)-4-acetoxybenzoic acid is removed and purified by recrystallization.

A mixture of 13 g. (0.05 mole) of 3-(3-methylbutyl)-4-acetoxybenzoic acid and 50 ml. of thionyl chloride is kept at room temperature overnight. The solution is concentrated at reduced pressure. The residue is dissolved in 50 ml. of dry benzene and reconcentrated at reduced pressure to yield a residue of 3-(3-methylbutyl)-4-acetoxybenzoyl chloride.

(2) *Condensation of 3-(3-methylbutyl)-4-acetoxybenzoyl chloride with 3-amino-4,7-dihydroxy-8-methylcoumarin hydrochloride.*—A suspension of 12.2 g. (0.05 mole) of 3-amino-4,7-dihydroxy-8-methylcoumarin hydrochloride in 100 ml. of water containing 16 g. of sodium acetate is treated portionwise with 14.3 g. (0.055 mole) of 3-(3-methylbutyl)-4-acetoxybenzoyl chloride while the mixture is being shaken. The mixture is shaken for about one hour after the final addition of acid chloride. The reaction mixture is acidified to about pH 2 with hydrochloric acid. The product is removed and purified by recrystallization.

Various changes and modifications may be made in carrying out the present invention without departing from the spirit and scope thereof. Insofar as these changes and modifications are within the purview of the annexed claims, they are to be considered as part of my invention.

What is claimed is:

1. In the process of producing novobiocin broths of enhanced activity by fermentation the improvement which comprises cultivating a novobiocin producing strain of *Streptomyces spheroides* in an aqueous nutrient medium containing a precursor from the group consisting of 3-(γ,γ-dimethylallyl)-4-hydroxybenzoic acid, 3-(3-methylbutyl)-4-hydroxybenzoic acid, 3-(3-[γ,γ-dimethylallyl]-4-hydroxybenzamido) - 4,7 - dihydroxy - 8 - methylcoumarin and 3-(3-[3 methylbutyl]-4-hydroxybenzamido)-4,7-dihydroxy-8-methylcoumarin.

2. The process of claim 1 in which the novobiocin producing strain is *Streptomyces spheroides* NRRL 2449.

3. The process of claim 1 in which the concentration of precursor is less than about 0.1 mg. per ml. of fermentation medium.

4. The process of producing novobiocin which comprises cultivating *Streptomyces spheroides* NRRL 2449 in an aqueous nutrient medium containing L-proline, glucose, inorgnaic salts necessary for the growth of said organism, and an amount of 3-(γ,γ-dimethylallyl)-4-hydroxybenzoic acid less than about 0.1 mg. per ml. of fermentation medium.

5. The process of producing novobiocin which comprises cultivating *Streptomyces spheroides* NRRL 2449 in an aqueous nutrient medium containing L-proline, glucose, inorganic salts necessary for the growth of said organism, and an amount of 3-(3-[3-methylbutyl]-4-hydroxybenzoic acid less than about 0.1 mg. per ml. of fermentation medium.

6. The process of producing novobiocin which comprises cultivating *Streptomyces spheroides* NRRL 2449 in an aqueous nutrient medium containing L-proline, glucose, inorganic salts necessary for the growth of said organism, and an amount of 3-(3-[γ,γ-dimethylallyl]-4-hydroxybenzamido) - 4,7 - dihydroxy - 8 - methylcoumarin less than about 0.1 mg. per ml. of fermentation medium.

7. The process of producing novobiocin which comprises cultivating *Streptomyces spheroides* NRRL 2449 in an aqueous nutrient medium containing L-proline, glucose, inorganic salts necessary for the growth of said organism, and an amount of 3-(3-[3-methylbutyl]-4-hydroxybenzamido) - 4,7 - dihydroxy - 8 - methylcoumarin less than about 0.1 mg. per ml. of fermentation medium.

References Cited in the file of this patent

Erickson: Ann. Review of Microbiology, vol. 3, 1949, pages 23–34.

Baldacci: Archiv für Mikrobiologie, 1954, vol. 20, No. 4, pages 347–357.

New York Academy of Science, vol. 60, Art. 1, October 1954, pages 4, 5, 136–151.

Wallick et al.: Antibiotics Annual, 1955–1956, pages 909–917.

Welch et al.: Antibiotics and Chemotherapy, vol. 5, December 1955, pages 670–673.

Dietz et al.: Antibiotics and Chemotherapy, vol. 6, No. 2, February 1956, pages 135–142.

Pridham: 4th Ann. Symposium on Antibiotics, October 1956, Paper No. 125.